(12) United States Patent
Hockin

(10) Patent No.: US 7,768,797 B1
(45) Date of Patent: Aug. 3, 2010

(54) AUTOMATICALLY DETECTING A COMPUTER CHASSIS TYPE

(75) Inventor: Timothe P. Hockin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 332 days.

(21) Appl. No.: 12/042,970

(22) Filed: Mar. 5, 2008

(51) Int. Cl.
*H05K 7/02* (2006.01)
(52) U.S. Cl. ............... 361/807; 174/138 D; 174/138 G
(58) Field of Classification Search ........... 361/681, 361/752, 807; 174/138 D, 138 G
See application file for complete search history.

(56) References Cited

U.S. PATENT DOCUMENTS 6,259,032 B1 *  7/2001  Fernandez .............. 174/138 E
7,079,395 B2 *  7/2006  Garnett et al. ............. 361/715
2004/0176920 A1 *  9/2004  Monfared et al. ............ 702/75
2008/0244311 A1 * 10/2008  Elliott et al. ................ 714/22
2009/0094664 A1 *  4/2009  Butler et al. ................. 726/1
2010/0064165 A1 *  3/2010  Kambara et al. ............. 714/4

* cited by examiner

*Primary Examiner*—Jeremy C Norris
*Assistant Examiner*—Yuriy Semenenko
(74) *Attorney, Agent, or Firm*—Park, Vaughan & Fleming LLP

(57) ABSTRACT

A chassis identification system is described which enables a motherboard in a computer system to identify a type of chassis in which the motherboard is installed. This chassis identification system is composed of a motherboard, a set of conductive fastener mounts on the motherboard, and a sensing circuit on the motherboard that is coupled to the set of conductive fastener mounts. The set of conductive fastener mounts on the motherboard are configured to accommodate different patterns of conductive fasteners which are associated with different types of chassis. Moreover, the sensing circuit on the motherboard is configured to generate a chassis identifier based on a pattern of the conductive fasteners on the chassis.

19 Claims, 6 Drawing Sheets

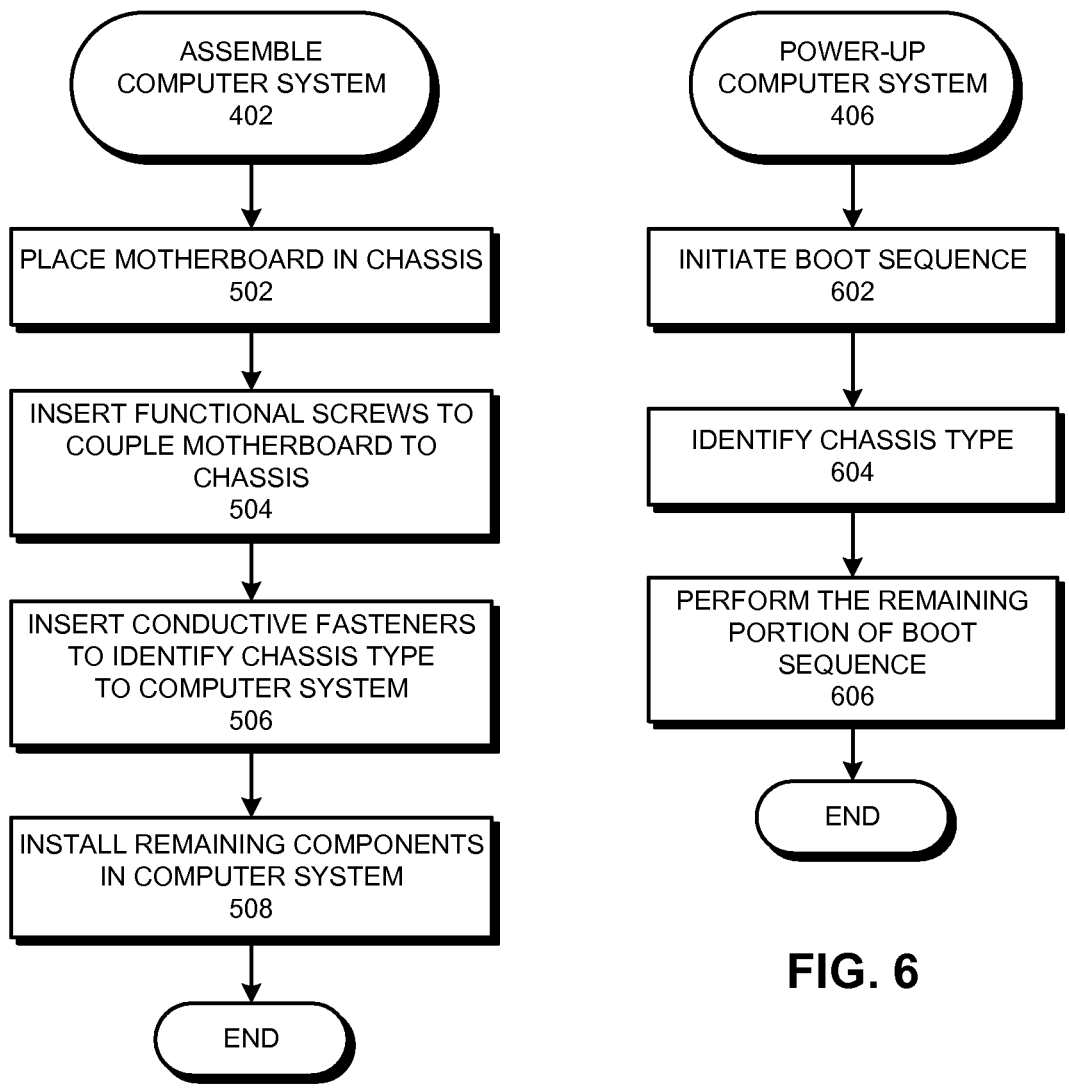

AUTOMATICALLY DETECTING A COMPUTER CHASSIS TYPE

BACKGROUND

1. Field

The present embodiments generally relate to techniques for configuring computer system components.

2. Related Art

Corporations typically maintain a variety of different types of computer systems, which can have a variety of different types of chassis. For example, different chassis can have different expansion bays, different dimensions, or variations in other characteristics such as power supply type. During the lifetime of a computer system, it is possible that a given motherboard may be placed in different types of chassis. Consequently, system administrators need to keep track of motherboards and the chassis in which they are installed to ensure that the motherboards are configured to be compatible with the chassis.

When a manufacturer assembles a computer system, the manufacturer typically scans a barcode on the chassis which contains a part or model number that identifies the chassis in which the motherboard is currently installed. The manufacturer then stores the chassis type ID in a programmable read-only memory (ROM) on the motherboard, and the motherboard is installed in that chassis. However, if a technician moves the motherboard from one chassis to another, the chassis barcode needs to be rescanned and programmed into the ROM. This forces the technician to repeat the steps of scanning the barcode and programming the scanned value into the ROM.

SUMMARY

A chassis identification system is described which enables a motherboard in a computer system to identify a type of chassis in which the motherboard is installed. This chassis identification system is composed of a motherboard, a set of conductive fastener mounts on the motherboard, and a sensing circuit on the motherboard that is coupled to the set of conductive fastener mounts. The set of conductive fastener mounts on the motherboard are configured to accommodate different patterns of conductive fasteners which are associated with different types of chassis. Moreover, the sensing circuit on the motherboard is configured to generate a chassis identifier based on a pattern of the conductive fasteners on the chassis.

In a variation on this embodiment, a conductive fastener comprises a conductive front-end which is mechanically coupled to the conductive fastener mount on the motherboard, and a conductive back-end which is mechanically coupled to the chassis. Note that the back-end and the front-end are conductively coupled when the motherboard is secured to the chassis.

In a variation on this embodiment, the front-end conductive fastener includes a conductive screw, and the back-end conductive fastener includes a conductive standoff or conductive screw anchor.

In a variation on this embodiment, the chassis is composed of a conductive material, which is electrically coupled to ground.

In a variation on this embodiment, the sensing circuit further comprises a weak pull-up network that is electrically coupled to a respective conductive fastener mount on the motherboard, and a sampling mechanism that is configured to convert the combination of voltage values across the set of conductive fastener mounts on the motherboard into a bit-vector. Moreover, the back-end conductive fasteners are electrically coupled to the chassis, which is electrically coupled to ground. Therefore, coupling a grounded back-end conductive fastener on the chassis to a corresponding front-end conductive fastener on the motherboard establishes a connection between ground and the corresponding front-end conductive fastener, which causes a logical zero value to appear on the corresponding conductive fastener mount on the motherboard. Conversely, not coupling a grounded back-end conductive fastener on the chassis to a corresponding front-end conductive fastener on the motherboard causes a logical one value to appear on the corresponding conductive fastener mount. In a variation on this embodiment, coupling a subset of front-end conductive fasteners on the motherboard to the corresponding set of back-end conductive fasteners on the chassis causes a logical zero value to appear on the front-end conductive fasteners that are coupled to back-end conductive fasteners, and causes a logical one value to appear on the front-end conductive fasteners that are not coupled to back-end conductive fasteners.

In a variation on this embodiment, the sensing circuit samples the configuration of logical zero and logical one values across the set of conductive fastener mounts on the motherboard and provides the motherboard with a corresponding bit-vector that identifies the chassis type.

In a variation on this embodiment, the sensing circuit further comprises a floating voltage source, a weak pull-down network, and a sampling mechanism. The weak pull-down network is electrically coupled to a respective conductive fastener mount on the motherboard, thereby grounding the respective conductive fastener mount. When a respective back-end conductive fastener on the chassis is coupled to a corresponding front-end conductive fastener on the motherboard, the floating voltage source becomes electrically coupled to the conductive fastener mount on the motherboard, thereby causing a logical one value to appear on the conductive fastener mount. Conversely, if a respective front-end conductive fastener is not electrically coupled to a corresponding back-end conductive fastener on the chassis, the corresponding conductive fastener mount on the motherboard remains grounded, thereby causing a logical zero value to appear on the conductive fastener mount. The sampling mechanism is configured to convert the combination of voltage values across the set of front-end conductive fastener mounts on the motherboard into a bit-vector.

In a variation on this embodiment, coupling a subset of front-end conductive fasteners on the motherboard to the corresponding set of back-end conductive fasteners on the chassis causes a logical one value to appear on the conductive fastener mounts on the motherboard that are coupled to a back-end conductive fastener on the chassis, and causes a logical zero value to appear on the conductive fastener mounts on the motherboard that are not coupled to a back-end conductive fastener on the chassis.

In a variation on this embodiment, the sensing circuit samples the configuration of logical zero and logical one values across the set of conductive fastener mounts on the motherboard and provides the motherboard with a corresponding bit-vector that identifies the chassis type.

BRIEF DESCRIPTION OF THE FIGURES

FIG. 5 presents a flowchart illustrating the steps involved in assembling a computer system.

FIG. 6 presents a flowchart illustrating the steps involved in powering-up a computer system.

DETAILED DESCRIPTION

The following description is presented to enable any person skilled in the art to make and use variations of the described embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computing Environment

Figure 1:
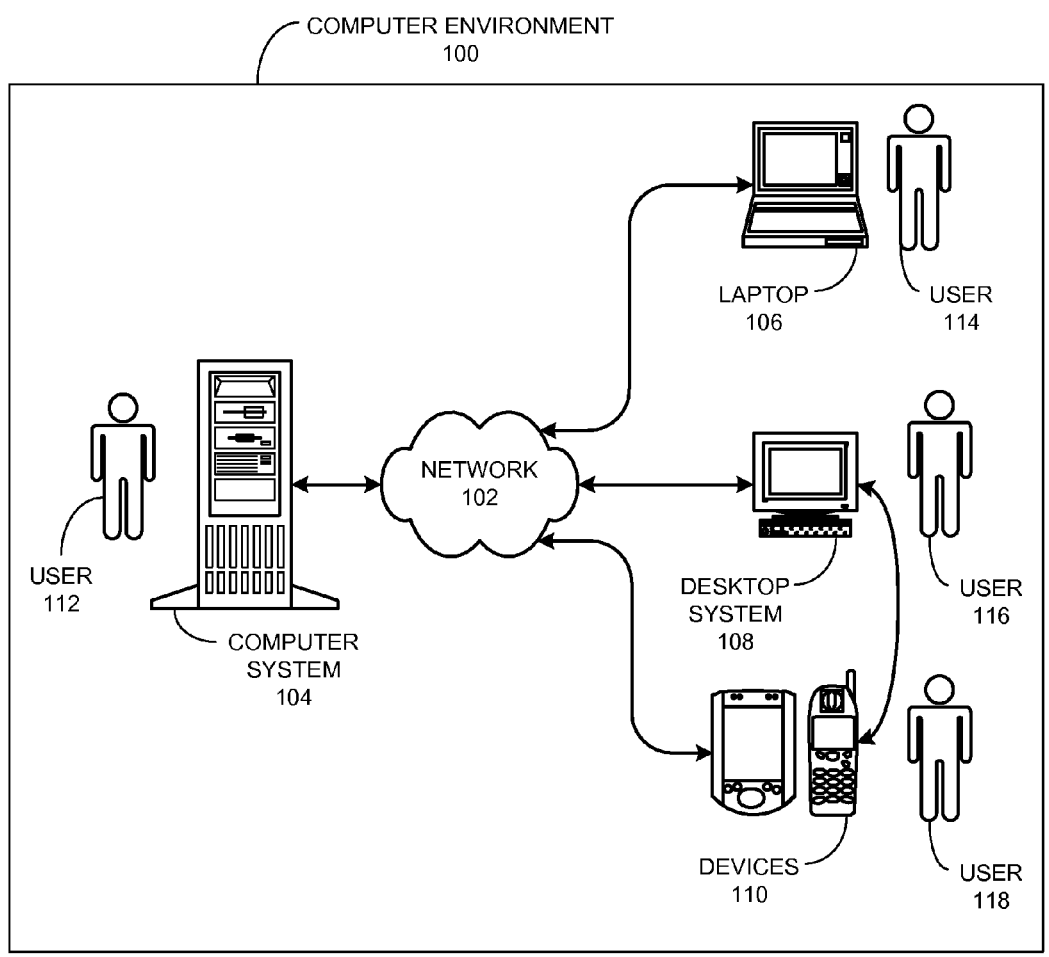
FIG. 1 illustrates an embodiment of a computing environment.

FIG. 1 illustrates an embodiment of a computing environment 100. Computing environment 100 includes a number of computing devices, which can generally include any type of computing device based on a microprocessor, a mainframe computer, a digital signal processor, a portable computing device, a personal organizer, a device controller, or a computational engine within an appliance. More specifically, referring to FIG. 1, computing environment 100 includes network 102, computer system 104, laptop 106, desktop system 108, and devices 110.

Network 102 can include any type of wired or wireless communication channel capable of coupling together computing nodes 104-110. This includes, but is not limited to, a local area network, a wide area network, or a combination of networks. In one embodiment, network 102 includes the Internet. In some embodiments, network 102 includes telephone and cellular telephone networks.

Computing nodes 104-110 can include any node on a network including computational capability and including a mechanism for communicating across network 102.

Devices 110 can include any type of electronic device that can be coupled to a computing node, such as desktop system 108, or to a network, such as network 102, to interact with computer system 104. These devices include, but are not limited to, a mobile telephone, or a personal digital assistant (PDA).

Users 112-118 can include: an individual; a group of individuals; an organization; a group of organizations; a computing system; a group of computing systems; or any other entity that can interact with computer system 104.

Note that different embodiments may use different configurations, and are not limited to the configurations illustrated in computing environment 100. In some embodiments, the interaction with computer system 104 can be performed through a web service on computer system 104, while in other embodiments, the interaction with computer system 104 can be performed through an application executing on computing nodes 106-110. Also note that users 112-118 may interact with computer system 104 via various devices, such as via laptop 106, desktop system 108, devices 110, or directly via computer system 104.

Computer System

Figure 2:
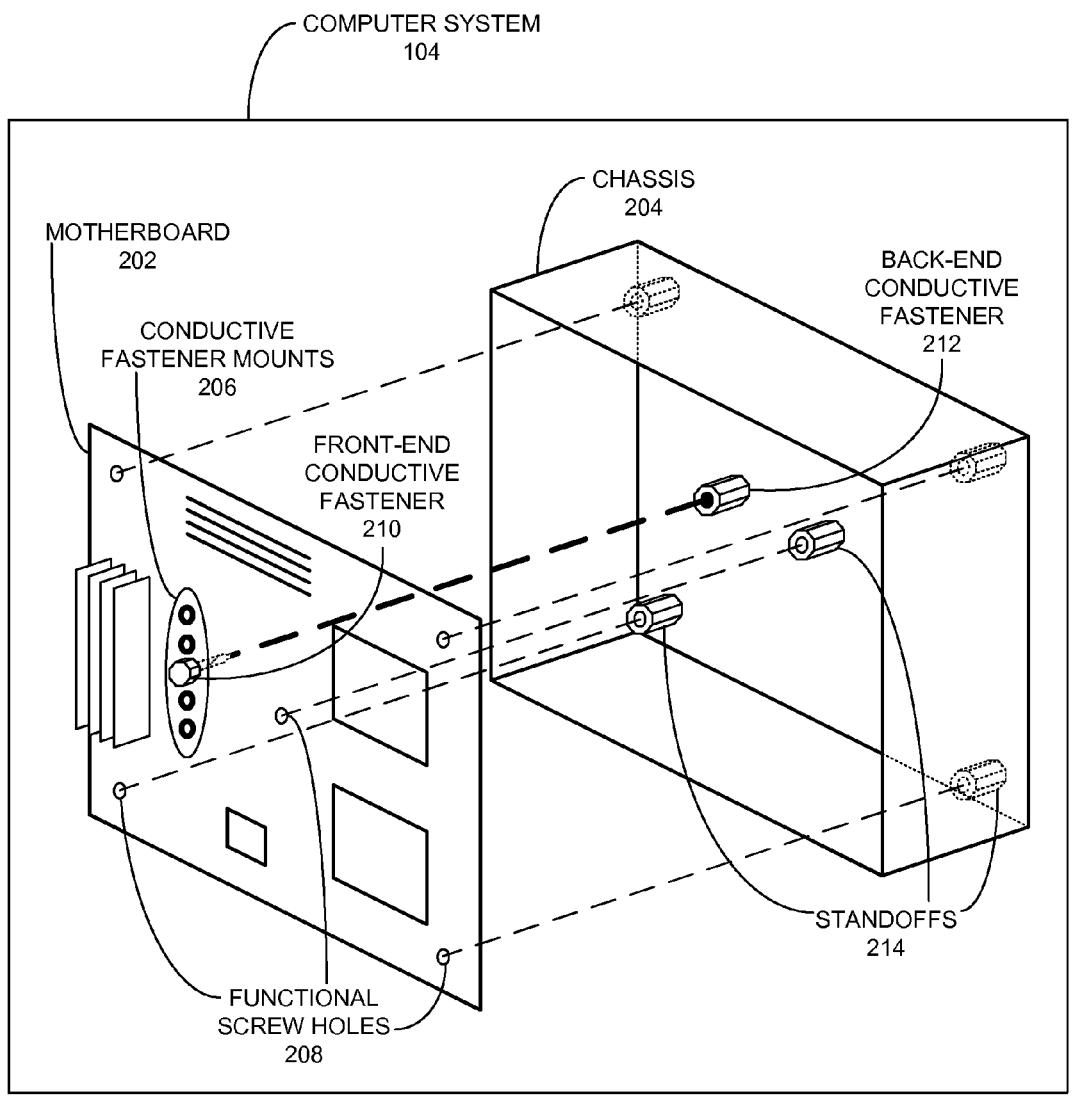
FIG. 2 illustrates an embodiment of a motherboard and chassis assembly of a computer system.

FIG. 2 illustrates a motherboard 202 and chassis 204 assembly of computer system 104 in accordance with an embodiment. Motherboard 202 comprises conductive fastener mounts 206 and functional screw holes 208. Chassis 204 is composed of a conductive material, comprises a number of back-end conductive fasteners 212, and chassis 204 is coupled to ground during normal operation of computer system 104. Moreover, the configuration of back-end conductive fasteners on a respective chassis type for chassis 204 is unique from other configurations of back-end conductive fasteners on other chassis types.

To assemble computer system 104, motherboard 202 is mechanically coupled to chassis 204 by placing motherboard 202 inside chassis 204 against the back wall and inserting screws through functional screw holes 208 and into standoffs 214. To complete the assembly of computer system 104, front-end conductive fasteners 210 are inserted into the conductive fastener mounts 206 that have a corresponding back-end conductive fastener 212 from chassis 204.

Figure 3:
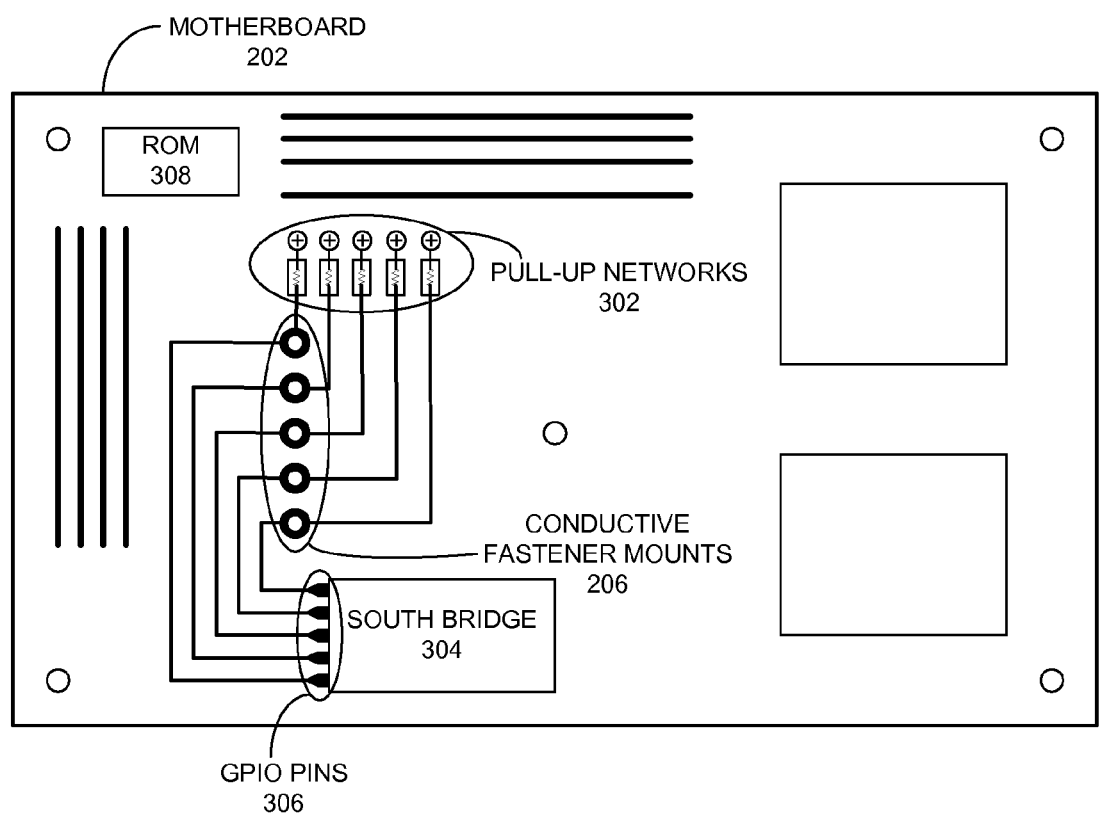
FIG. 3 illustrates an embodiment of a motherboard comprising conductive fastener mounts.

FIG. 3 illustrates motherboard 202 comprising conductive fastener mounts 206 in accordance with an embodiment. Conductive fastener mounts 206 are individually coupled to a corresponding pull-up network 302, and are individually coupled to a corresponding general purpose input-output (GPIO) pin 306 on south bridge 304.

When a respective conductive fastener mount 206 is coupled through a front-end conductive fastener 210 to a corresponding back-end conductive fastener 212 on a grounded chassis 204, the grounded connection causes the corresponding GPIO pin 306 on south bridge 304 to establish a logical zero value. Conversely, when a respective conductive fastener mount 206 is not coupled to a corresponding back-end conductive fastener 212 on a grounded chassis 204, a corresponding pull-up network 302 causes the corresponding GPIO pin 306 on south bridge 304 to establish a logical one value.

Figure 4:
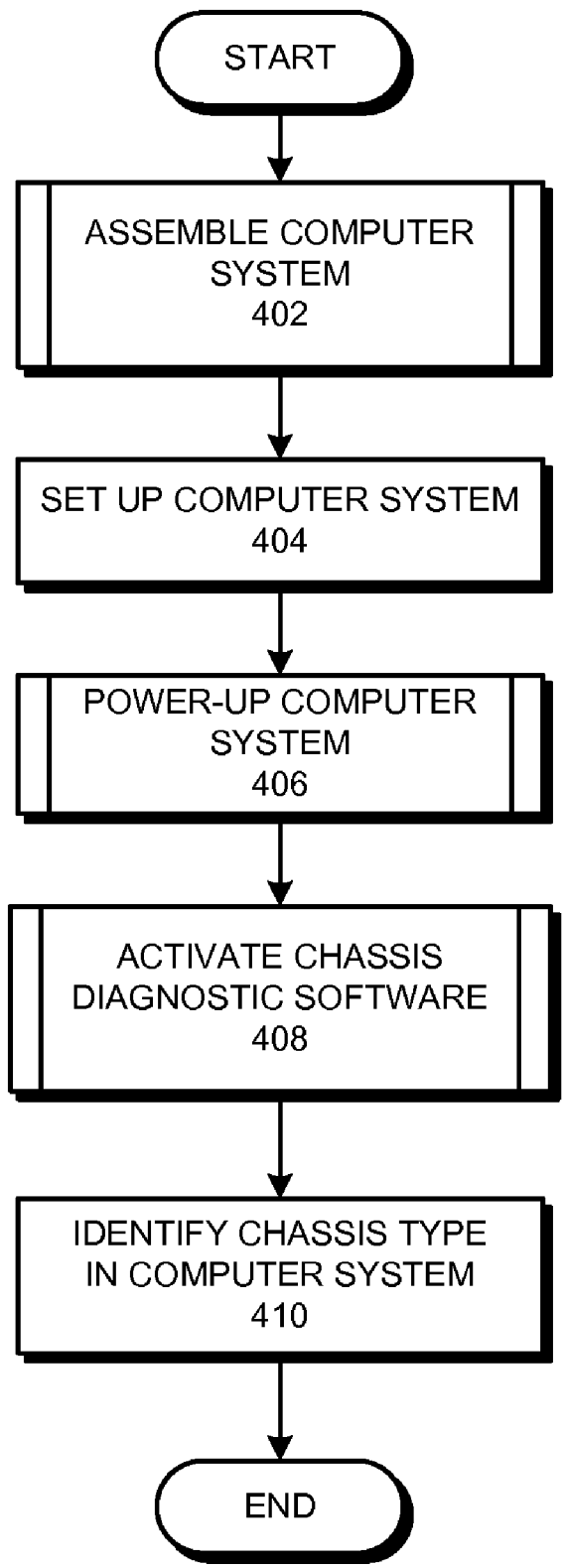
FIG. 4 presents a flowchart illustrating how a user can assemble a computer system and identify the chassis type at runtime.

FIG. 4 presents a flowchart illustrating how a user can assemble computer system 104 and how the computer system can automatically identify the chassis type at runtime in accordance with an embodiment. The installation process begins with the user assembling computer system 104 (step 402). Note that assembly of computer system 104 can be performed by a manufacturer of computer system 104, a consumer of computer system 104, an end-user of computer system 104, or any other person affiliated with computer system 104.

Once the internal components of computer system 104 are assembled and configured, the user sets up the computer system (step 404). This involves coupling computer system 104 to a power source, and can include coupling the computer system 104 to a monitor, a keyboard, a mouse, a computer network, or to any other peripheral device or connection that is useful to the user.

Next, the user powers up computer system 104 (step 406), which initiates the boot sequence. In one embodiment, the boot sequence performs diagnostic operations on computer system 104 to identify the chassis type for chassis 204 by probing GPIO pins 306 associated with conductive fastener mounts 206. In a variation of this embodiment, the boot sequence may store the identified chassis type in a programmable read-only memory (ROM) 308, which may also store the basic input/output system (BIOS) of motherboard 202.

At any point during normal operation of computer system 104, the user can activate the chassis diagnostic software for computer system 104 (step 408). For example, the user can activate the chassis diagnostic software on computer system 104 as an initial diagnostic check of computer system 104, during a routine diagnostic check of computer system 104, or when computer system 104 is malfunctioning. In one embodiment, the user can activate the chassis diagnostic software on computer system 104 through an input device attached to computer system 104, such as a keyboard, or a mouse. In another embodiment, the user can activate the chassis diagnostic software on computer system 104 over network 102 through a remote computing device, such as laptop 106, desktop system 108, or devices 110.

In one embodiment, the chassis diagnostic software for computer system 104 identifies the chassis type for chassis 204 by retrieving the diagnostic results that are generated during the boot sequence of computer system 104 (from diagnostic results generated in step 406).

In another embodiment, the chassis diagnostic software for computer system 104 identifies the chassis type for chassis 204 by probing, at runtime, GPIO pins 306 associated with conductive fastener mounts 206.

The user can then activate the chassis diagnostic software (step 408) and identify the chassis type for chassis 204 in computer system 104 (step 410) by analyzing the results of the diagnostic software for computer system 104.

FIG. 5 presents a flowchart illustrating the steps involved in assembling computer system 104 in accordance with an embodiment (step 402). To assemble computer system 104, a user first places motherboard 202 in chassis 204, such that motherboard 202 is placed against the back wall of chassis 204 (step 502). Then, the user inserts functional screws into functional screw holes 208 to couple motherboard 202 to chassis 204 (step 504). To complete the fastening process, the user inserts front-end conductive fasteners 210 into the conductive fastener mounts 206 that have a corresponding back-end conductive fastener 212 from chassis 204, thereby identifying the chassis type to computer system 104 (step 506). Once motherboard 202 is fastened to chassis 204, the user can install any remaining components into computer system 104 (step 508).

FIG. 6 presents a flowchart illustrating the steps involved in powering-up computer system 104 in accordance with an embodiment (step 406). Computer system 104 begins by initiating a boot sequence (step 602), which includes forcing the internal electronics and components of computer system 104 into an initial reset state, and performing other operations that initiate the operation of these internal electronics and components.

During the boot sequence, computer system 104 performs a probe to identify the chassis type for chassis 204 (step 604). During this probe, computer system 104 uses south bridge 304 to probe the conductive fastener mounts 206 and identify the chassis type for the chassis 204 of computer system 104. In one possible variation of this embodiment, the boot sequence may store the identified chassis type in a programmable read-only memory (ROM) device 308, which may be the basic input/output system (BIOS) of motherboard 202.

After computer system 104 identifies the chassis type for chassis 204, computer system 104 performs the remaining portions of the boot sequence (step 606) to prepare computer system 104 for normal operation.

Figure 7:
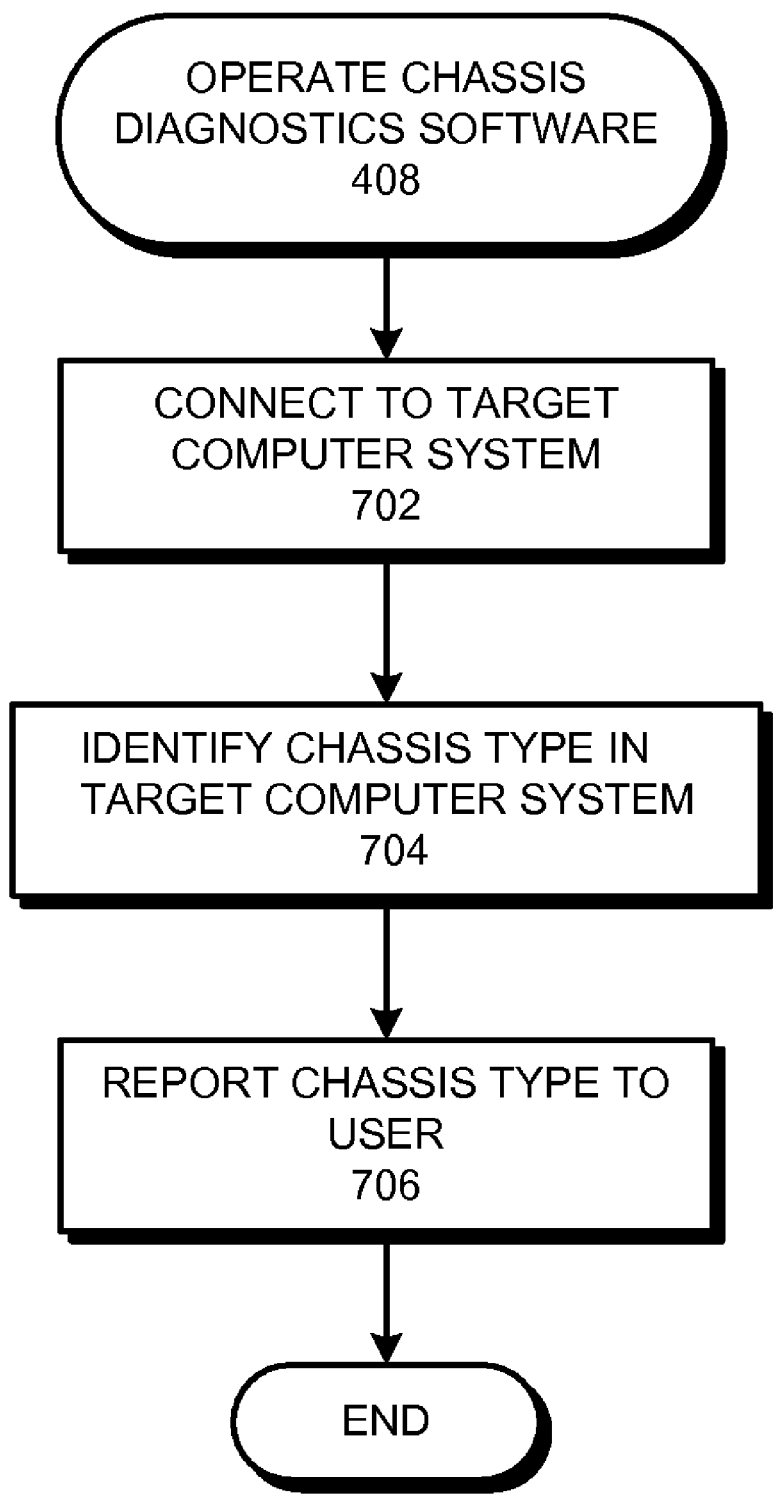
FIG. 7 presents a flowchart illustrating the operation of chassis diagnostic software.

FIG. 7 presents a flowchart illustrating the operation of chassis diagnostic software (step 408) in accordance with an embodiment. The chassis diagnostic software begins by connecting to the target computer system 104 (step 702). In a variation of this embodiment, user 112 activates the chassis diagnostic software on the target computer (e.g., computer system 104). In another variation of this embodiment, user 114-118 activates the chassis diagnostic software from a remote computing device (e.g., laptop 106, desktop system 108, or devices 110).

During operation of the chassis diagnostic software, the diagnostic software identifies the chassis type for chassis 204 of computer system 104 (step 704). In one embodiment, the chassis diagnostic software for computer system 104 identifies the chassis type for chassis 204 by retrieving the diagnostic results that are generated during the boot sequence of computer system 104 by accessing ROM device 308 (from diagnostic results generated in step 406). In another embodiment, the chassis diagnostic software for computer system 104 identifies the chassis type for chassis 204 by probing, at runtime, GPIO pins 306 associated with conductive fastener mounts 206.

After the chassis diagnostic software has analyzed the target computer system, the chassis diagnostic software reports the chassis type of chassis 204 to the user (step 706). Alternatively, the chassis diagnostic software can report the chassis type to an application which automatically configures the motherboard to operate with the identified type of chassis.

Possible Variations

One variation of the embodiments includes a sensing circuit comprising a pull-down network instead of a pull-up network 302, which causes a conductive fastener mount 206 to hold a logical zero value when it is not coupled to a corresponding back-end conductive fastener 212 on a chassis 204. Specifically, the sensing circuit comprises a floating voltage source, a weak pull-down network, and a sampling mechanism. The weak pull-down network is electrically coupled to a respective conductive fastener mount 206 on motherboard 202, which grounds the respective conductive fastener mount 206.

When a respective back-end conductive fastener 212 on chassis 204 is coupled to a corresponding front-end conductive fastener 210 on motherboard 202, the floating voltage source becomes electrically coupled to a corresponding conductive fastener mount 206 on the motherboard, thereby causing a logical one value to appear on the conductive fastener mount 206. Conversely, if a respective front-end conductive fastener 210 is not electrically coupled to a corresponding back-end conductive fastener 212 on the chassis, the corresponding conductive fastener mount 206 on motherboard 202 remains grounded, thereby causing a logical zero value to appear on the conductive fastener mount 206. The sampling mechanism is configured to convert the combination of voltage values across the set of front-end conductive fastener mounts 206 on motherboard 202 into a bit-vector.

In other words, when a respective conductive fastener mount 206 is coupled, by a front-end conductive fastener 210, to a corresponding back-end conductive fastener 212 on a chassis 204, the floating voltage source becomes coupled to a corresponding GPIO pin 306 on south bridge 304, thereby causing the corresponding GPIO pin 306 to establish a logical one value. Conversely, when a respective conductive fastener mount 206 is not coupled to a corresponding back-end conductive fastener 212 on a chassis 204, the corresponding pull-down network causes the corresponding GPIO pin 306 on south bridge 304 to establish a logical zero value.

The foregoing descriptions of embodiments have been presented only for purposes of illustration and description. They are not intended to be exhaustive or to limit the claimed system to the forms disclosed. Accordingly, many modifications and variations will be apparent to practitioners skilled in the art. Additionally, the above disclosure is not intended to limit the claims.

What is claimed is:

1. A chassis identification system, comprising:
   a motherboard;
   a set of conductive fastener mounts on the motherboard; and
   a sensing circuit on the motherboard coupled to the set of conductive fastener mounts, wherein the sensing circuit is configured to generate a chassis identifier based on a pattern of the conductive fasteners on the chassis.

2. The chassis identification system of claim 1, wherein a conductive fastener comprises:
   a conductive front-end mechanically coupled to a respective conductive fastener mount on the motherboard; and
   a conductive back-end mechanically coupled to the chassis;
   wherein the back-end and the front-end are conductively coupled when the motherboard is secured to the chassis.

3. The chassis identification system of claim 2, wherein the front-end conductive fastener includes a conductive screw; and
   wherein the back-end conductive fastener includes a conductive standoff or conductive screw anchor.

4. The chassis identification system of claim 2, wherein the chassis is composed of a conductive material; and
   wherein the chassis is electrically coupled to ground.

5. The chassis identification system of claim 4, wherein the sensing circuit further comprises:
   a weak pull-up network electrically coupled to a respective conductive fastener mount on the motherboard; and
   a sampling mechanism configured to convert the combination of voltage values across the set of conductive fastener mounts on the motherboard into a bit-vector; and
   wherein when a respective back-end conductive fastener is electrically coupled to the chassis, the respective back-end conductive fastener is electrically coupled to ground.

6. The chassis identification system of claim 5, wherein the set of conductive back-end fasteners are configured so that coupling a subset of front-end conductive fasteners on the motherboard to the corresponding set of back-end conductive fasteners on the chassis causes a logical zero value to appear on the conductive fastener mounts on the motherboard that are coupled to back-end conductive fasteners, and causes a logical one value to appear on the conductive fastener mounts on the motherboard that are not coupled to back-end conductive fasteners.

7. The chassis identification system of claim 6, wherein the sensing circuit is configured to sample the configuration of logical zero and logical one values across the set of conductive fastener mounts on the motherboard and provides the motherboard with a corresponding bit-vector which identifies the chassis type.

8. The chassis identification system of claim 4, wherein the sensing circuit further comprises:
   a weak pull-down network electrically coupled to a respective conductive fastener mount on the motherboard;
   a floating voltage source that, when a respective back-end conductive fastener is coupled to a corresponding front-end conductive fastener, becomes electrically coupled to the conductive fastener mount; and
   a sampling mechanism configured to convert the combination of voltage values across the set of conductive fastener mounts on the motherboard into a bit-vector.

9. The chassis identification system of claim 8, wherein the set of conductive back-end fasteners are configured so that coupling a subset of front-end conductive fasteners on the motherboard to the corresponding set of back-end conductive fasteners on the chassis causes a logical one value to appear on the conductive fastener mounts on the motherboard that are coupled to a back-end conductive fastener on the chassis, and causes a logical zero value to appear on the conductive fastener mounts on the motherboard that are not coupled to a back-end conductive fastener on the chassis.

10. The chassis identification system of claim 9, wherein the sensing circuit is configured to sample the configuration of logical zero and logical one values across the set of conductive fastener mounts on the motherboard and provides the motherboard with a corresponding bit-vector which identifies the chassis type.

11. A computer system, comprising:
    a motherboard;
    a chassis, wherein the chassis is composed of a conductive material, and wherein the chassis is electrically coupled to ground;
    a set of conductive fastener mounts on the motherboard; and
    a sensing circuit on the motherboard coupled to the set of conductive fastener mounts, wherein the sensing circuit is configured to generate a chassis identifier based on a pattern of the conductive fasteners on the chassis.

12. The computer system of claim 11, wherein a conductive fastener comprises:
    a conductive front-end mechanically coupled to a respective conductive fastener mount on the motherboard; and
    a conductive back-end mechanically coupled to the chassis;
    wherein the back-end and the front-end are configured to be coupled to each other; and
    wherein the back-end and the front-end are configured to be conductively coupled when the motherboard is secured to the chassis.

13. The computer system of claim 12, wherein the front-end conductive fastener includes a conductive screw; and
    wherein the back-end conductive fastener includes a conductive standoff or conductive screw anchor.

14. The computer system of claim 13, wherein the sensing circuit further comprises:
    a weak pull-up network electrically coupled to a respective conductive fastener mount on the motherboard;
    a sampling mechanism configured to convert the combination of voltage values across the set of conductive fastener mounts on the motherboard into a bit-vector; and
    wherein when a respective back-end conductive fastener is electrically coupled to the chassis, the respective back-end conductive fastener is electrically coupled to ground.

15. The computer system of claim 14, wherein the set of back-end conductive fasteners are configured so that coupling a subset of front-end conductive fasteners on the motherboard to the corresponding set of back-end conductive fasteners on the chassis causes a logical zero value to appear on the conductive fastener mounts on the motherboard that are coupled to back-end conductive fasteners, and causes a logical one value to appear on the conductive fastener mounts on the motherboard that are not coupled to back-end conductive fasteners.

16. The computer system of claim 15, wherein the sensing circuit is configured to sample the configuration of logical zero and logical one values across the set of conductive fastener mounts on the motherboard and provides the motherboard with a corresponding bit-vector which identifies the chassis type.

17. The computer system of claim 12, wherein the sensing circuit further comprises:
- a weak pull-down network that is electrically coupled to a respective conductive fastener mount on the motherboard;
- a floating voltage source that, when a respective back-end conductive fastener is coupled to a corresponding front-end conductive fastener, becomes electrically coupled to the corresponding conductive fastener mount on the motherboard; and
- a sampling mechanism configured to convert the combination of voltage values across the set of conductive fastener mounts on the motherboard into a bit-vector.

18. The computer system of claim 17, wherein the set of back-end conductive fasteners are configured so that coupling a subset of front-end conductive fasteners on the motherboard to the corresponding set of back-end conductive fasteners on the chassis causes a logical one value to appear on the conductive fastener mounts on the motherboard that are coupled to a back-end conductive fastener on the chassis, and causes a logical zero value to appear on the conductive fastener mounts on the motherboard that are not coupled to a back-end conductive fastener on the chassis.

19. The computer system of claim 18, wherein the sensing circuit is configured to sample the configuration of logical zero and logical one values across the set of conductive fastener mounts on the motherboard and provides the motherboard with a corresponding bit-vector which identifies the chassis type.

* * * * *